2,906,628
METHOD OF PRESERVING COLOR OF GREEN VEGETABLES

George J. Malecki, Daytona Beach, Fla., assignor to Patent Protection Corporation, New York, N.Y., a corporation of New York, trustee No Drawing. Application February 8, 1956
Serial No. 564,129

7 Claims. (Cl. 99—186)

This invention relates to methods of preserving the color of green vegetables. It is well known that in the canning of green vegetables, particularly peas, the chlorophyll is broken down to a greater or less degree resulting in a corresponding change in color from green toward yellow. It is also known that this change in color is materially reduced if the canning solution is maintained at a pH in the order of 8–8.5.

It is also known that a canning solution with added alkali to bring the pH to this value at the time it is added to the can will during the processing suffer a change in pH to 7–7.5 with a noticeable change in the greenness of the peas. Numerous attempts have been made to employ alkalis in the canning process in a manner to preserve the color of the chlorophyll and at the same time not adversely affect the flavor and texture of the product. The most successful process to date is that described in U.S. Patent No. 2,827,382, dated March 18, 1958, wherein disodium glutamate is added to the canning solution to increase its initial alkalinity and also serve as a buffer during the processing and subsequent storage to maintain the pH above that value where the yellowing of the peas becomes pronounced.

The invention of the present application is primarily an improvement on the process described in my above mentioned co-pending application, but the added steps hereinafter described may also be employed with the conventional canning processes involving no alkalizing steps or with other processes wherein the canning solution contains added alkaline salts. When so employed such added steps will to a quite significant extent effect the same advantageous results as when employed in conjunction with the process of my above mentioned application.

In canning peas by the preferred process described in my co-pending application the freshly shelled peas are first blanched by soaking them in a hot water bath containing about one quarter of one percent magnesium hydroxide for two to five minutes. The cans are then filled with the peas and an aqueous canning solution containing by weight 4.5% sugar, 2.5% salt, 0.4% disodium glutamate and sufficient N/10 normal solution of sodium hydroxide to bring the pH of the solution after processing to 8.5. The cans are then closed and cooked with steam at approximately 260° F. for 11 minutes and after cooling are labelled and packed in cartons for shipment or storage.

I have found that the natural color of the peas will be more perfectly preserved if immediately before or immediately after blanching, the peas are subjected to a brief dip in an alkaline solution such as a 3–6% solution of sodium hydroxide. The period of the dip should be between 5 and 10 seconds with the alkaline solution at room temperature. The chlorophyll in the outside layer of the peas immediately below the skin of the peas determines primarily the color of the peas to the eye when the cans are opened. The skin of the peas is a porous membrane and the rate of diffusion of the liquid in which the peas are submerged through the skin is dependent upon the concentration of the solution. At the above mentioned concentration, namely 3–6% sodium hydroxide, the solution diffuses rapidly through the pores of the skin and raises the pH of the liquid within the skin with the result that the chlorophyll at the surface of the peas retains its green color more perfectly and for a much longer storage period than when this step is not employed.

Even with the added disodium glutamate the pH of the canning solution becomes gradually lower in storage, but apparently the pH of the liquid within the skin of the peas remains at a higher value than the solution itself and consequently retards the color change which would otherwise occur.

The above described treatment does not adversely affect the taste or texture of the peas. In fact, the texture is noticeably improved. Apparently the sodium hydroxide which diffuses through the skin of the peas effects a swelling of the starch at the surface of the peas, the swelling being, however, insufficient to make the peas mushy.

Instead of adding the above specified quantity of disodium glutamate to the canning solution and employing the above described dip to prolong the storage period the dip may be employed and a lesser amount of disodium glutamate added to the canning solution.

Generally speaking, when the dip as herein described is employed the same color preservation will result with a 50% reduction in the amount of disodium glutamate employed, thereby substantially reducing the added cost of the disodium glutamate process.

I have also discovered that the above described disodium glutamate process may be further improved by adding to the canning solution sodium sulfite in an amount in the order of 200 parts per million. The sodium sulfite, in addition to acting as a reducing agent, also serves to bleach the canning solution. It has been observed that alkaline canning solutions in which peas and other vegetables are submerged develop a yellow tinge due probably to the action of the alkali on the glucose in the canning solution. Whatever the cause, this discoloration is prevented by adding sodium bisulfite to the canning solution. The amount which may be added is not critical. Fifty parts per million will have a significant bleaching action and as much as 500 parts per million may be used if necessary to completely prevent this discoloration.

The addition of the sodium bisulfite also improves the flavor of the peas, particularly in preventing the soapy taste which may result from the added alkali. The sodium bisulfite is also a reducing agent and may be used with advantage in lieu of the reducing agents specified in the aforementioned U.S. Patent No. 2,827,382.

In the above specification I have specified sodium hydroxide and sodium sulfite as the compounds to be used in carrying out my improved process, but the equivalent compounds of the other alkali metals and alkaline earth metals may be used instead.

It will also be understood that the above described additions to my disodium glutamate process may be used either separately or together, and as pointed out above, either or both steps may be advantageously added to conventional canning processes and also to other processes involving the addition of alkalis.

I claim:
1. In the canning of peas the step which consists in dipping the peas in a 3–6% sodium hydroxide solution for a period of approximately 5–10 seconds before placing the peas and canning solution in the cans.

2. The process of canning peas which consists in dipping the peas in an alkaline solution having a concentration equivalent to 3–6% sodium hydroxide solution for a period of approximately 5–10 seconds, placing the peas and an alkaline canning solution having a pH after processing of less than 8.0 in the cans, and heat treating the cans.

3. The process of canning green peas which consists in dipping the peas in a 3-6% sodium hydroxide solution for a period of approximately 5-10 seconds, placing the peas and a canning solution containing disodium glutamate and having a pH after processing of 8.0-8.5 in the cans, and heat treating the cans.

4. In the canning of green vegetables the step which consists in adding to the vegetables and the canning solution a sulfite compound of an alkali metal or alkaline earth metal in an amount in the order of 200 parts per million of sodium sulfite.

5. The process of canning green vegetables which comprises placing in the vegetables a canning solution having a pH after processing of 8.0-8.5 and containing a sulfite compound of an alkali metal or alkaline earth metal in an amount in the order of 200 parts per million of sodium sulfite and heat treating the cans.

6. The process of canning peas which consists in dipping the peas in an alkaline solution having a concentration equivalent to 3-6% sodium hydroxide solution for a period of approximately 5-10 seconds, placing the peas and an alkaline canning solution, containing sodium sulfite in an amount in the order of 200 parts per million in the cans, and heat treating the cans.

7. The process of claim 6 wherein the canning solution contains 0.3 to 0.8 percent by weight of disodium glutamate and having a pH after processing of 8.0-8.5.

References Cited in the file of this patent

UNITED STATES PATENTS

| | | |
|---|---|---|
| 1,666,551 | Butler | Apr. 17, 1928 |
| 1,680,865 | Fujii | Aug. 14, 1928 |
| 2,189,774 | Blair | Feb. 13, 1940 |
| 2,305,643 | Stevenson et al. | Dec. 22, 1942 |
| 2,417,932 | Kalmar | Mar. 25, 1947 |
| 2,589,037 | Bendix et al. | Mar. 11, 1952 |
| 2,628,905 | Antle | Feb. 17, 1953 |

OTHER REFERENCES

"Food Packer," July 1948, p. 30, article entitled "Monosodium Glutamate."